United States Patent
Mathews et al.

(10) Patent No.: US 6,405,233 B1
(45) Date of Patent: Jun. 11, 2002

(54) UNALIGNED SEMAPHORE ADDER

(75) Inventors: Gregory S. Mathews, Santa Clara; Jeng-Jye Shaw, Palo Alto, both of CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/345,717

(22) Filed: Jun. 30, 1999

(51) Int. Cl.[7] ................................................. G06F 7/50
(52) U.S. Cl. ........................................................ 708/670
(58) Field of Search ................................. 708/670, 711, 708/212

(56) References Cited

U.S. PATENT DOCUMENTS

| | | | |
|---|---|---|---|
| 4,737,926 A | | 4/1988 | Vo et al. |
| 5,073,864 A | * | 12/1991 | Methvin et al. ............ 708/212 |
| 5,394,551 A | | 2/1995 | Holt et al. |
| 5,519,842 A | | 5/1996 | Atallah et al. |
| 5,696,939 A | | 12/1997 | Iacobovici et al. |
| 5,943,251 A | * | 8/1999 | Jiang et al. ................. 708/711 |

* cited by examiner

*Primary Examiner*—Tan V. Mai
(74) *Attorney, Agent, or Firm*—Blakely, Sokoloff, Taylor & Zafman LLP

(57) ABSTRACT

A technique for receiving a first data from a storage location in which the first data is not stored fully aligned within processor data boundaries for data retrieval. The adder also receives a second data having its alignment adjusted to correspond to the first data and adds the first data and the second data in CPU unaligned format. A carry control circuit coupled to the adder determines which carries are selected for transfer to the next stage for calculating a sum of the two data.

25 Claims, 17 Drawing Sheets

UNALIGNED SEMAPHORE ADDER

BACKGROUND OF THE INVENTION

1. Field of the Invention

The present invention relates to the field of processing devices and, more particularly to an adder for manipulating unaligned data.

2. Background of the Related Art

The use of semaphore operations in a multiple processor environment is generally known. Where multiple processing devices attempt to acquire a shared device, such as memory, semaphores are used to control the access. Without this control, a second processor may acquire the shared device while a first processor is performing operations with the shared device. Data corruption can result from such conflicts.

A semaphore is generally utilized to control the accesses to the shared device to prevent data corruption. Typically, a semaphore associated with the shared device is checked by a processor attempting to gain access (Read). If a value of the semaphore indicates that the access is permitted (Conditional Modify), the processor updates the value of the semaphore to indicate to other processors that the shared device is in use (Write). This manipulation of the semaphore must be performed atomically by the processor to guarantee that multiple processors cannot see the device as available at the same time.

Another method of controlling access to devices is performed by using a semaphore as a number for order of access. A processor reads the semaphore (gets its number), adds a number to the value (such as 1), and then writes it back (creates the number for the next processor). Manipulation of the semaphore must be atomic to guarantee that multiple processors do not obtain the same access number. The processor then checks a separate memory location which contains the number of the processor currently using the desired device. When its number comes up, it is able to access the device. Once it has completed its accesses, it updates the memory location to point to the next processor.

A commonly used semaphore instruction is a fetch-and add instruction. A fetch-and-add instruction fetches a semaphore value, places a copy of the fetched semaphore in a CPU (central processing unit) register, modifies the semaphore value by adding a number to it and then writes the resulting sum back to the semaphore location as an atomic Read-Modify-Write operation.

FIG. 1 illustrates a typical prior art procedure for performing a fetch-and-add operation when the semaphore is established in some memory device. The semaphore value stored in memory may not correspond to boundaries which are processor (CPU) aligned. Thus, the semaphore value may be memory aligned, but not CPU aligned. When the value is not CPU aligned, the retrieved data will need to be adjusted by rotating or shifting the data until it is CPU aligned (as shown in block 10) and stored in a register 11. The data to be added to the semaphore value is CPU aligned, since this data is typically defined by an immediate operand of the fetch-and-add instruction. An adder 12 performs the addition of the two CPU aligned data, resulting in a sum which is also CPU aligned.

Subsequently, the sum (representing the modified semaphore value) will need to be returned to the semaphore location. However, in order to return the modified value back to the original memory location, the data may need to be unaligned from the CPU alignment. Accordingly, the modified data will need to be adjusted (rotated or shifted, as shown in block 13) to realign the modified data to the original memory alignment for write back to the memory location.

As noted in FIG. 1, the typical prior art implementation optimized to minimize area would utilize existing CPU resources at the expense of performance by causing a long serial path to execute the semaphore. The data would be initially fetched, rotated, operated upon, the result rotated again, and finally written back to memory. This serial execution model results in lowered system performance because of lost bandwidth through the CPU resources, which the semaphore is occupying/reserving for use and the inability of other processors to access the semaphore (amount of time taken by a processor to complete the Read-Modify-Write cycle before a second processor can read the semaphore).

Furthermore, one optimized alternative prior art implementation maintains performance by an increase in the area cost. In this case, additional dedicated logic would be created on the CPU to replace the use of existing CPU resources. Thus, the semaphore would still be executed by the same fetch, rotate, operate, result rotate, write-back sequence, but lost bandwidth due to occupied CPU resources would be removed. However, lost system performance caused by the inability of other processors to access the semaphore (amount of time taken by a processor to complete the Read-Modify-Write cycle before a second processor can read the semaphore) would still exist.

SUMMARY OF THE INVENTION

The present invention describes an adder for receiving a first data from a storage location in which the first data is stored in byte format, but in which the first data is not stored fully aligned within processor data boundaries for data retrieval. The adder also receives a second data having its byte alignment adjusted to correspond to a byte alignment of the first data as received by the adder and adds corresponding bytes of the first data and the second data. A carry control circuit coupled to the adder determines which bytes are selected for transfer of a carry from one byte to the next for calculating a sum of the two data.

DETAILED DESCRIPTION OF THE INVENTION

Figure 1:
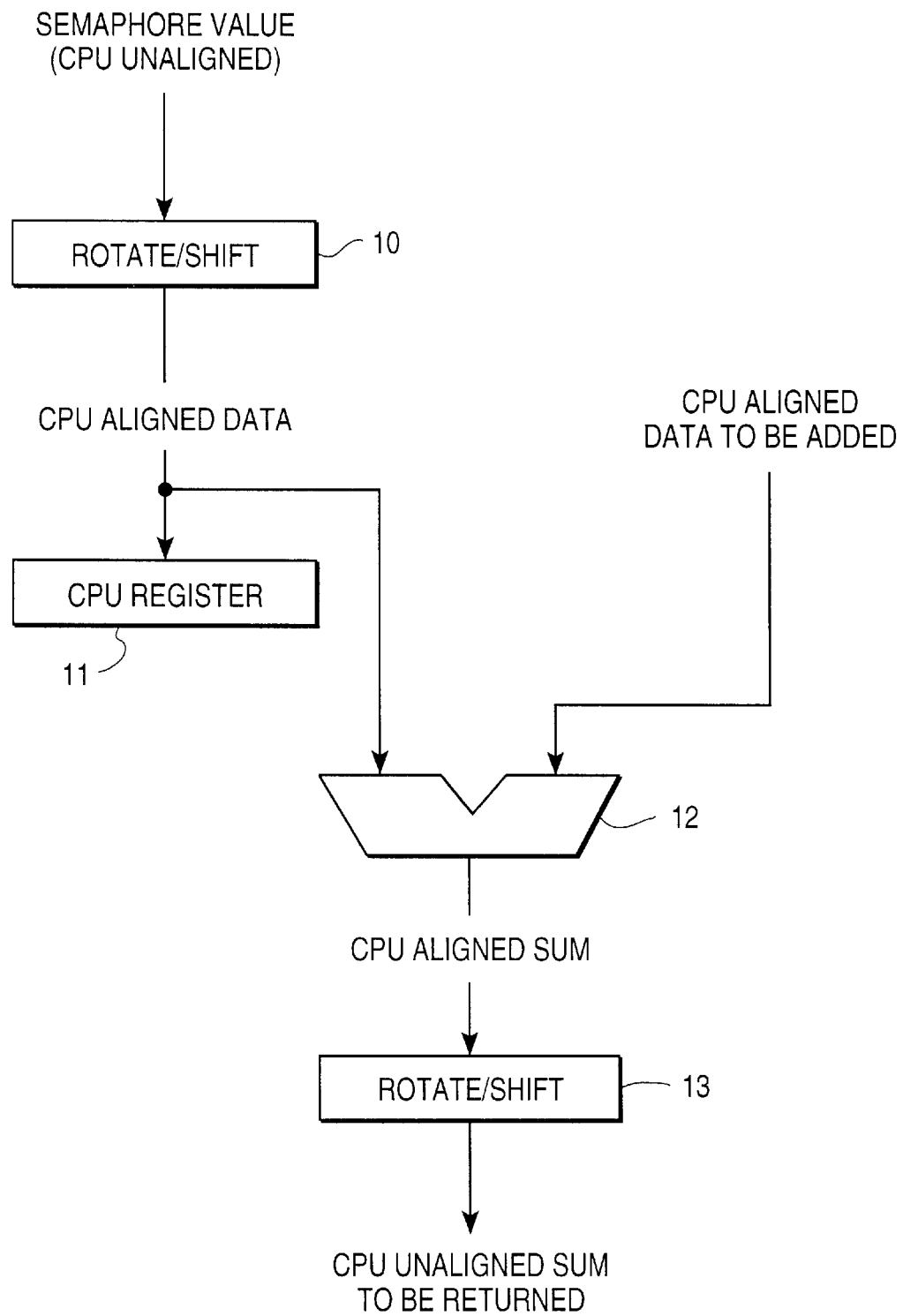
FIG. 1 is a data flow diagram know in the art, in which data is first CPU aligned before addition is performed on a semaphore value.
Figure 2:
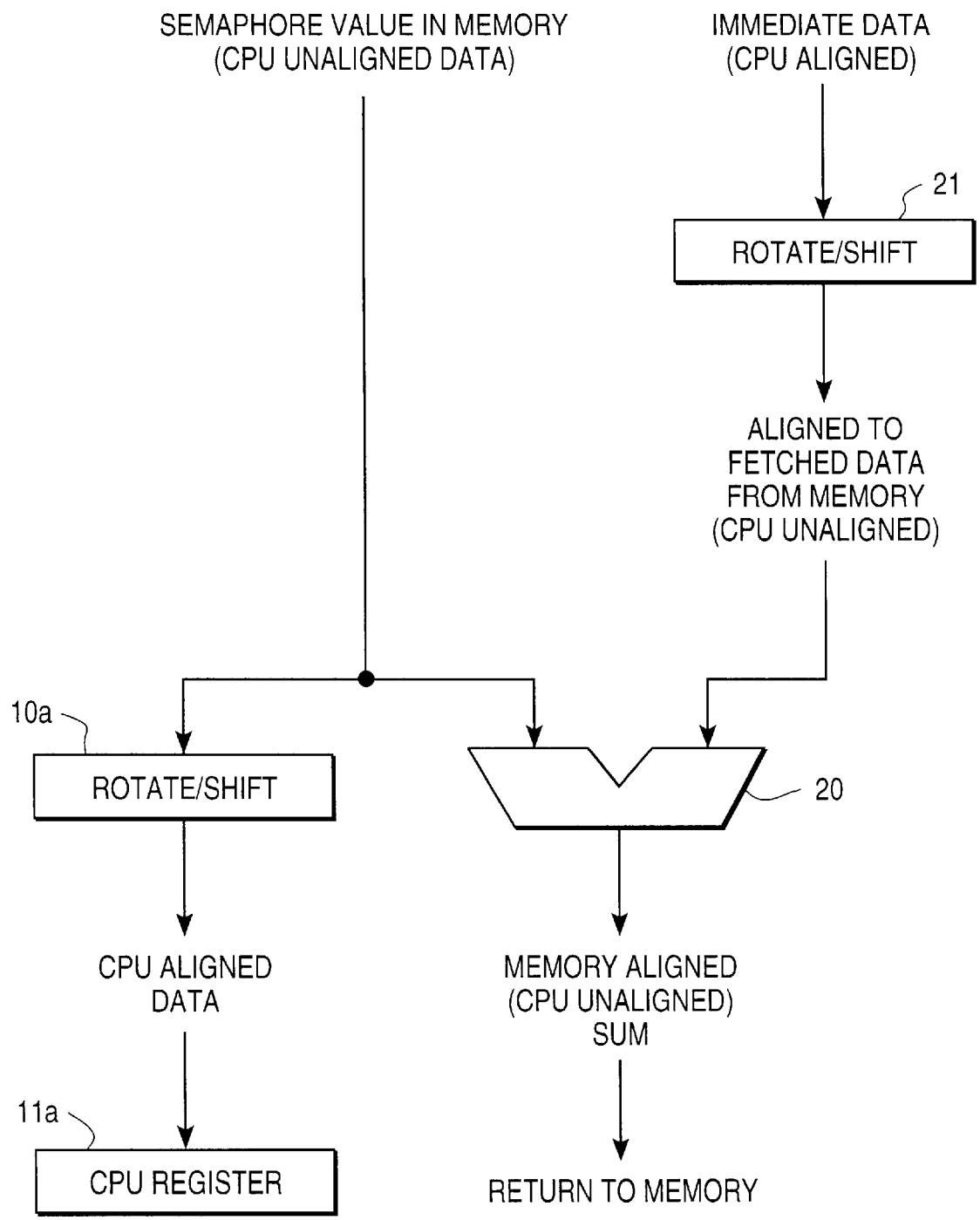
FIG. 2 is a data flow diagram of the present invention, in which unaligned addition is performed on CPU unaligned semaphore value.

Referring to FIG. 2, a technique for performing an unaligned read-modify write operation is illustrated. The particular read-modify-write operation is a fetch-and-add followed by a write back. That is, a fetch-and-add instruction fetches (retrieves, reads or loads) data from a stored location, such as a location in main memory, and adds a value to the fetched data. The resulting sum is then written back to a storage location, which typically is the original location where the data was fetched. The fetch-and-add is typically used as a semaphore instruction to perform an atomic semaphore operation. Although the preferred embodiment is described in reference to a semaphore fetch-and-add operation, it is to be noted that the present invention need not be limited to such use.

As illustrated in FIG. 2, a semaphore value is stored in a semaphore location. Typically, the semaphore is resident (saved or stored) in some location in memory. When transferring data from memory to a processor (hereinafter referred to as a central processing unit or CPU), data is retrieved from memory and placed on the CPU bus in the bus format (typically aligned to its position within a bus word; for example, for a two byte read at address 4 with an eight-byte bus, the bytes at memory address 4 and 5 would typically end up on the bus in the $4^{th}$ and $5^{th}$ byte positions respectively, regardless of endianness). The CPU receives the data from the bus, and then must align the data to fit its register/internal format (for CPUs of Intel Corporation, the register/internal format is typically right-justified and little endian). That is, for a two byte read from address 4, memory bytes 4 and 5 would end up in register byte positions 1 and 2, respectively, if the memory data was little endian and would end up in register byte positions 2 and 1, respectively, if the memory data was big endian. Thus, memory data may be unaligned to the CPU register/internal word format.

The present invention fetches the semaphore value from memory and returns it to the processor, while additionally coupling it to one input of an adder 20. The semaphore value may be CPU aligned or it may not (it may be memory aligned). A data to be added is coupled to the other input to the adder 20. This data is in the memory aligned format. For example, in executing the fetch-and-add instruction, the fetch portion of the instruction retrieves the data and the add portion of the instruction adds an immediate value (a value specified in the instruction operand) to the fetched data. If the semaphore data and the immediate data are out of alignment, an adjustment is required. The invention rotates the immediate data to correspond to the alignment of the fetched data by utilizing a rotator (or shifter) 21.

The adder 20 adds the immediate data, which is now CPU unaligned (or memory aligned), to the CPU unaligned fetched data. Thus, the resulting sum at the output of the adder 20 is also CPU unaligned and, further, the sum is aligned to the format of the original fetched data. The sum value is now written back to the memory. In the semaphore operation, the sum is written back to the original memory location of the fetched data. Since the write-back data is memory aligned, it can be readily written back to the original semaphore location without undergoing a rotation for alignment. Thus, a rotator is not needed for this write-back operation. The fetch-and-add and write back can be achieved externally to the CPU using only existing CPU data path rotators (the load rotator 10a for the "fetch" data returned to the CPU's internal registers 11a, and the store rotator 21 which is used to rotate the immediate value to the memory alignment). No rotator is needed for aligning the memory read to the adder or realigning the result to the memory.

Several examples of data manipulation are illustrated in FIGS. 3–6. In the examples of FIGS. 3A, 4A, 5A and 6A, it is presumed that the CPU operates in Little Endian format and data is also stored in memory in the Little Endian format. In FIGS. 3B, 4B, 5B and 6B, it is presumed that the CPU operates in Big Endian format and data is also stored in memory in the Big Endian format. Little Endian and Big Endian formats are known in the art, as well as processors and memories utilizing these formats.

Figure 3A:
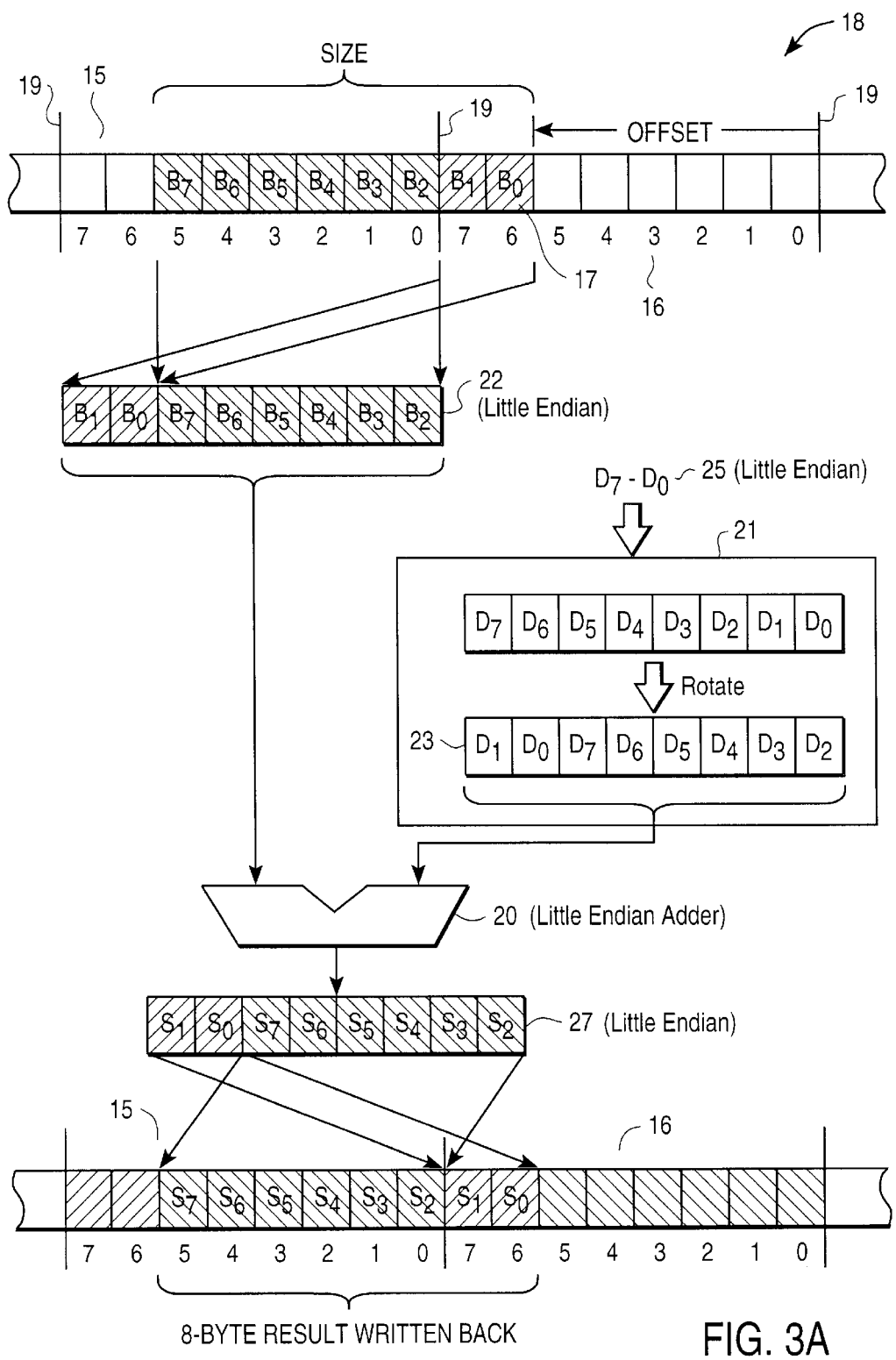
FIG. 3A illustrates one embodiment of the invention in performing unaligned addition when a stored value in memory is of full word length and resides across a CPU word boundary in Little Endian format and the data to be added is also in Little Endian format.

In FIG. 3A, data 17 is shown stored in a portion of memory 18. Data can be of a variety of data types, but in the example, data 17 performs as a semaphore. Accordingly, location of data 17 corresponds to the location of the semaphore in the memory 18. Furthermore, the memory 18 can be of a variety of memory devices, including cache memory (both on or off of the processor chip), main memory (which is typically comprised of random-access-memory, RAM) and disk memory. What is to be noted is that there is present some location in memory where the semaphore data is located.

In the particular example, the memory interface partitioning is done at word boundaries 19, based on an 8-byte word. The memory interface boundaries 19 correspond to the natural alignment of the example CPU's word size.

However, it is to be noted that data need not be stored strictly at these boundaries. Furthermore, data need not all be stored in 8-byte length. Thus, data may reside between the boundaries, but at less than word length, or data may reside across a CPU aligned word boundary 19. However, since memory management units generally transfer data to and from memory, the system knows the beginning of the data and the length of the data stored. Therefore, this CPU unaligned data 17 is termed as unaligned (CPU unaligned) or memory aligned data.

In the example of FIG. 3A, data 17 is eight bytes in length ($B_7$–$B_0$) and resides at bytes 5-0 of one 8-byte memory interface word location and bytes 7-6 of another 8-byte memory interface word location. Thus, FIG. 3A illustrates an example of an 8-byte boundary 19. The data 17 has a size of eight bytes and an offset of six bytes. The offset is the number of byte(s) separating the lowest addressed byte of the data 17 from a lower, naturally aligned, memory interface word (8-byte) boundary. For data 17, the lowest addressed byte is $B_0$, which is 6 bytes above a naturally aligned memory interface word (8-byte) boundary. In the Figures, $D_x$ represents data, while $B_x$ represents bytes. The bytes may be in either Little Endian or Big Endian format, but are represented as $B_7$–$B_0$. In Little Endian format, $B_0$ is the least significant data byte, while in Big Endian format $B_0$ is the most significant byte.

In order to perform the unaligned addition by the adder 20, data 17 is fetched into a register 22 as unaligned data. However, since the memory interface operates on 8-byte boundaries 19, bytes $B_2$–$B_7$ of memory location 15 are fetched in one cycle, and bytes $B_0$–$B_1$ of memory location 16 are fetched in another cycle. Since bytes $B_7$–$B_2$ reside at byte locations 5-0 (lower six bytes), bytes $B_7$–$B_2$ are loaded into the lower six byte positions of the register 22. Likewise, since bytes $B_1$–$B_0$ reside at the higher byte locations 7-6, the bytes $B_1$–$B_0$ are loaded into the two most significant byte positions of register 22. Thus, it is to be noted that the byte location placement based on memory interface alignment is unchanged when the data is loaded into register 22, however, the byte order is changed. As shown, bytes $B_7$–$B_0$ of data 17 are loaded into the register 22 in the order $B_1$–$B_0$–$B_7$–$B_6$–$B_5$–$B_4$–$B_3$–$B_2$.

In practice the actual loading of the data 17 into the register 22 is achieved in two transactions, one for loading word 15 and the second for loading word 16. In each of these loads, the unwanted bytes (not containing bytes of the data 17) are masked and not coupled to register 22. The eight bytes in the register 22 are coupled as the fetched input into the adder 20.

The data (D) to be added to the semaphore value is noted as data 25. Again, in a fetch-and-add operation, the data 25 is typically the immediate data specified by the instruction. The data 25 will generally have the same byte length as the data 17. Thus, in the example of FIG. 3A, the data 25 is comprised of bytes $D_7$–$D_0$, which is shown in Little Endian format. The size of the data 17 and the data 25 are the same.

Since this data 25 is CPU aligned, it needs to be adjusted to correspond to the byte alignment format of the data 17 as fetched into the register 22. That is, the ordering of the bytes must match. The rotator 21 performs this function and for area optimization, the same rotator as the existing CPU store rotator would be utilized (although a separate rotator could readily be used). Since the offset of the data 17 is known, the rotator 21 rotates the bytes of $D_7$–$D_0$ as shown, so that $D_1$–$D_0$ reside at the more significant byte positions 7, 6. Accordingly, the order of the bytes $D_7$–$D_0$ in a rotator register 23 after adjusting to unalign these bytes is $D_1$–$D_0$–$D_7$–$D_6$–$D_5$–$D_4$–$D_3$–$D_2$, which match the byte ordering for the fetched semaphore value in register 22. The unaligned data from the rotator 21 is coupled as the second input to the adder 20.

The adder 20 performs the unaligned addition of the two inputs. The addition operation is performed in byte groupings, so that the eight bits of a byte are added as a group. The addition by byte grouping allows the bytes to be out of order. How the unaligned addition is achieved is described in detail below. The resulting sum $S_7$–$S_0$ has the same byte order as the two inputs. The sum in register 27 has the ordering $S_1$–$S_0$–$S_7$–$S_6$–$S_5$–$S_4$–$S_3$–$S_2$. It is to be noted that the sum register 27 is shown as a separate register, but in practice the sum may be put back into register 22.

Then, a write is issued to write the sum back to the original location in memory as the modified data. In the write back, two cycles are again needed to write to the two memory locations 15, 16. During one cycle, $S_1$–$S_0$ are written back to the byte locations 7,6 of memory location 16. This is achieved by writing the register 27 contents to memory location 15, but selecting to write only the first two bytes $S_1$–$S_0$ and masking the rest. The masking of the unwanted bytes is determined by the original offset value. During the second cycle, the remaining bytes $S_7$–$S_2$ are written back to the byte locations 5-0 of memory location 15 in a similar masking operation. The address of the modified value returned to memory corresponds to the original location where the semaphore value resides and the byte ordering is the same as that of the original data 15. In the write back, bytes which are not to be written back are masked, so that data at the other byte locations are not written over. Thus, unaligned semaphore data is fetched, modified by adding a value to it and returned in the same unaligned format to the same location in memory. The only byte rotation required is performed on the CPU aligned data, which is being added to the semaphore data.

Figure 3B:
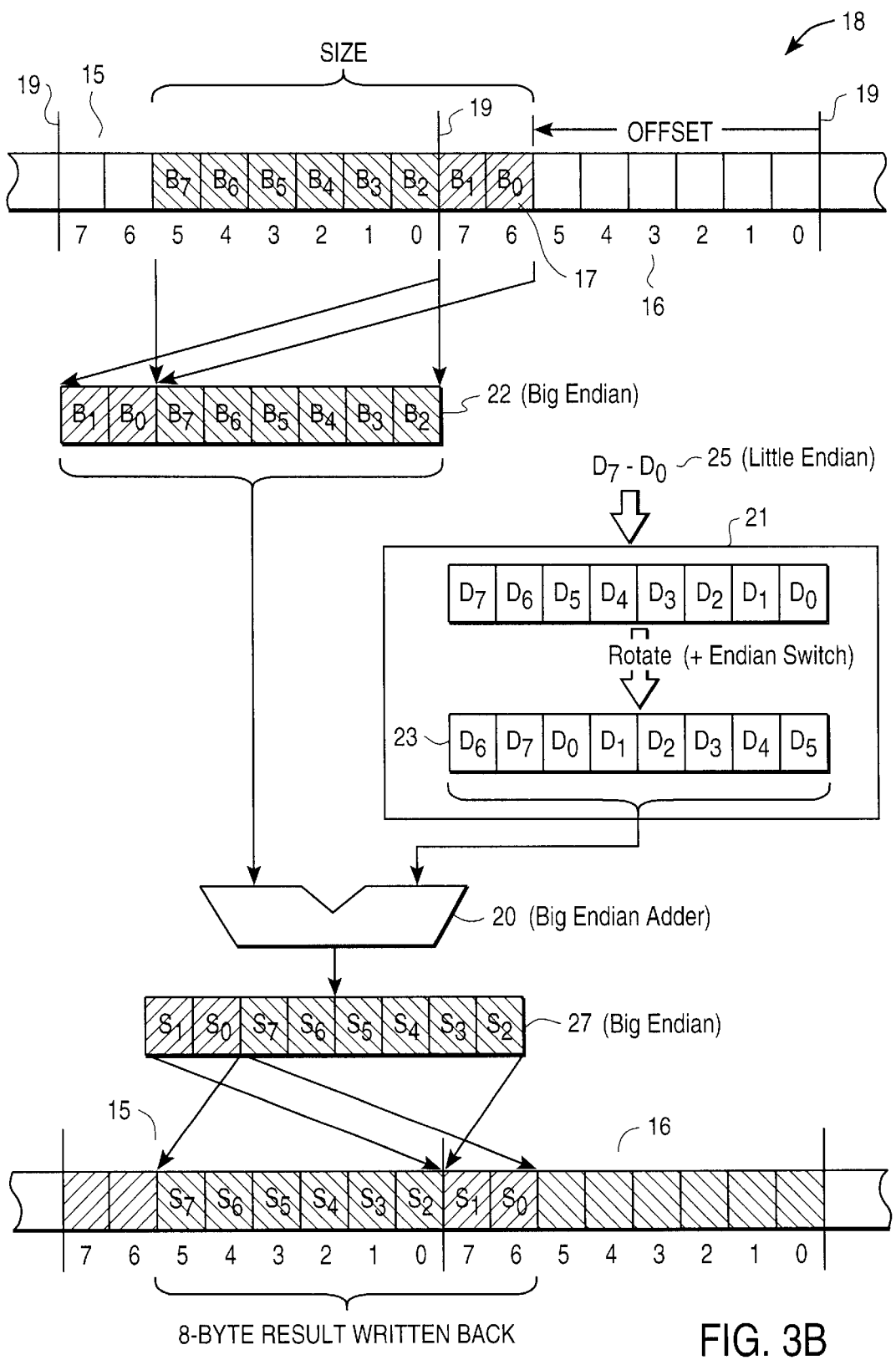
FIG. 3B illustrates one embodiment of the invention in performing unaligned addition when a stored value in memory is of full word length and resides across a CPU word boundary in Big Endian format and the data to be added is in Little Endian format.

In FIG. 3B, the same arrangement as FIG. 3A is shown except that the data storage is now configured in Big Endian format. Accordingly, the byte arrangement of the stored data is reversed in pattern so that $B_7$ now denotes the least significant byte and $B_0$ now denotes the most significant byte. The manipulation of the stored data bytes is the same as in FIG. 3A. The immediate data is shown in Little Endian format and this data will need to be converted to the Big Endian format before addition can be performed by the adder 20. The adder 20 performs an equivalent addition, except for the noted differences in the carry enable and propagation necessary for the different Endian formats, which are described later in reference to FIGS. 8–9.

Figure 4A:
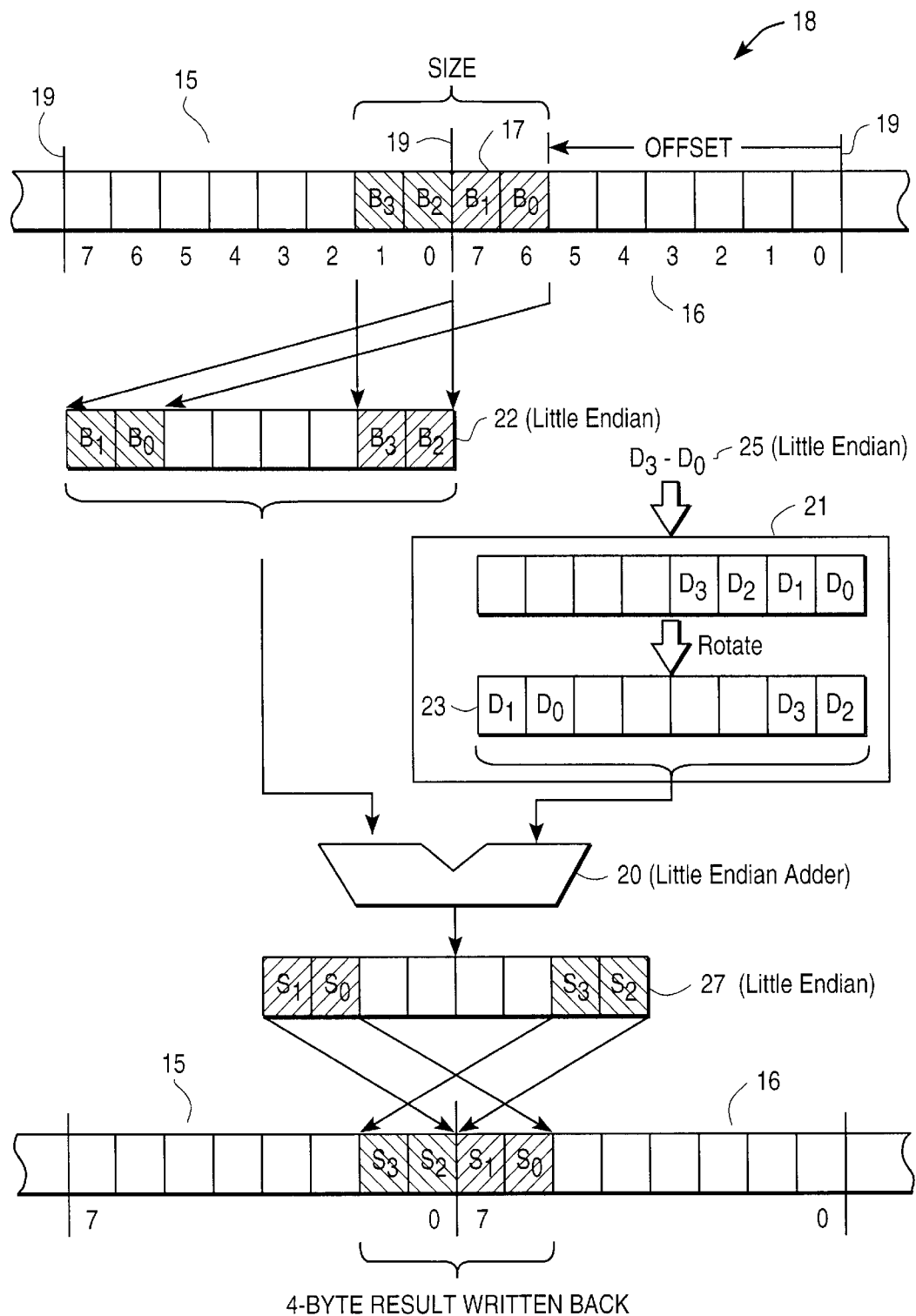
FIG. 4A illustrates another embodiment of the invention in performing unaligned addition when a stored value in memory is less than full word length and resides across a CPU word boundary in Little Endian format and the data to be added is also in Little Endian format.

FIG. 4A illustrates an example when the data 17 is less than the full eight bytes and the data still crosses a word boundary 19. In the example shown in FIG. 4A, the semaphore data is four bytes in length, $B_3$–$B_0$ in Little Endian format. Bytes $B_3$ and $B_2$ reside at byte locations 1,0 of memory location 15 and bytes $B_1$ and $B_0$ reside at byte locations 7, 6 of memory location 16. Therefore, the size of the data 17 is four bytes in size and the offset is 6. The two transactions are used to fetch bytes $B_1$, $B_0$ to byte positions 7, 6 of register 22, and to fetch bytes $B_3$, $B_2$ into the byte positions 1,0. As noted, register 22 content is $B_1$–$B_0$-x-x-x-x-$B_3$–$B_2$ (x designating a don't care condition). When the addition operation is performed, only these four bytes are operated on. Again, the details on how this is achieved is described below.

The CPU aligned data to be added is $D_3$–$D_0$ in Little Endian format. Since CPU alignment means that the data, $D_3$–$D_0$, is formatted such that $D_3$–$D_0$ are located in the least significant byte positions, rotation is performed to move $D_0$ and $D_1$ to the most significant byte positions, so that the register 21 contents are $D_1$–$D_0$-x-x-x-x-$D_3$–$D_2$ to correspond with the fetched data byte ordering in the register 22. Accordingly, the resulting sum in register 27 also has the byte ordering of $S_1$–$S_0$-x-x-x-x-$S_3$–$S_2$. Then, a first transaction writes back the register 27 content to the memory location 16, masking out the lower six bytes as determined by the offset. A second transaction writes back the register 27 content to the memory location 15, masking out all but the lower two bytes. Thus, bytes $S_3$–$S_2$–$S_1$–$S_0$ are written back to the original location of $B_3$–$B_2$–$B_1$–$B_0$ with the same byte ordering.

Figure 4B:
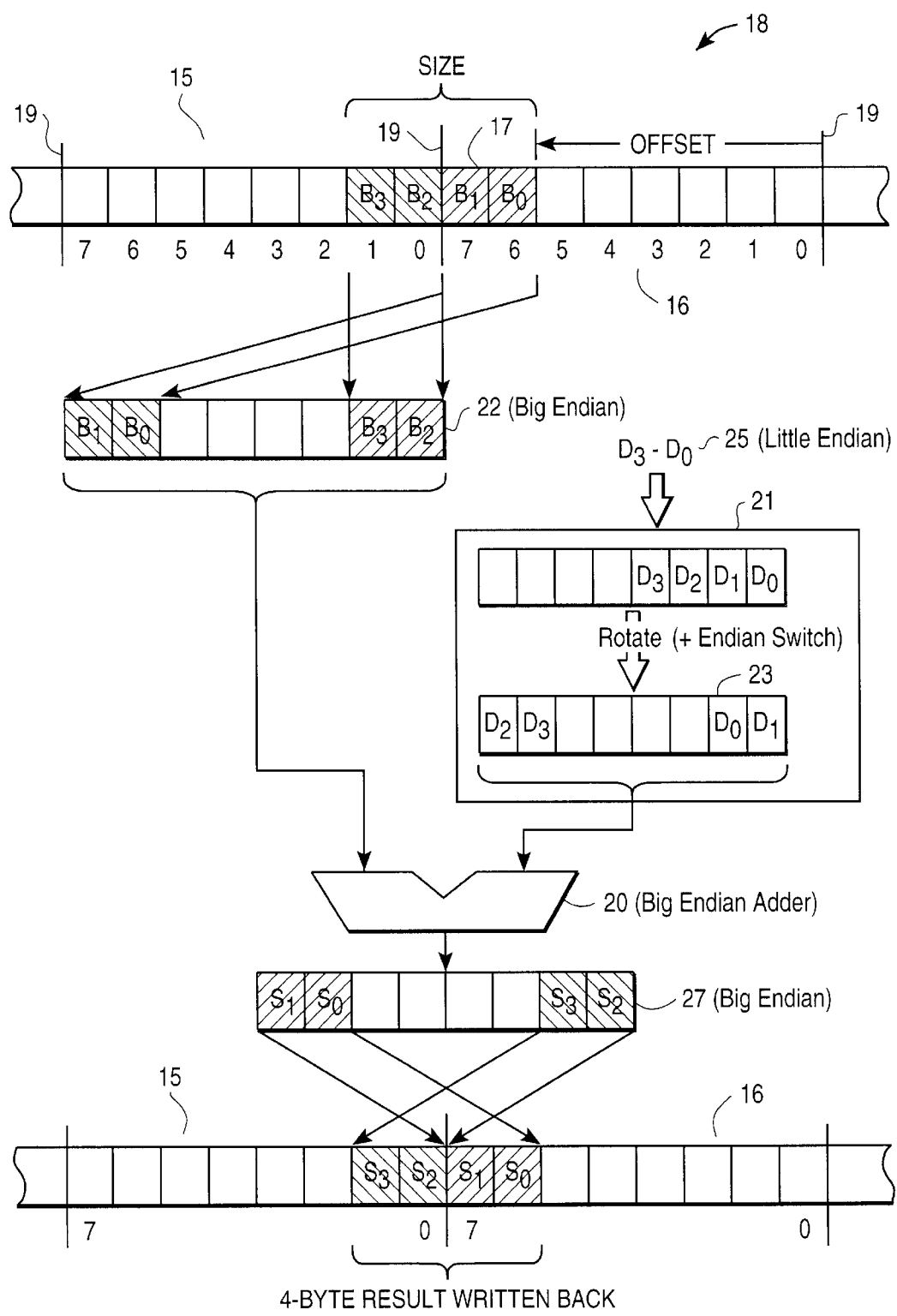
FIG. 4B illustrates another embodiment of the invention in performing unaligned addition when a stored value in memory is less than full word length and resides across a CPU word boundary in Big Endian format and the data to be added is in Little Endian format.

FIG. 4B shows the same arrangement as FIG. 4A, except that the data storage is now configured in Big Endian format. As noted earlier for FIGS. 3A–B, the manipulation of the stored data bytes is the same as in FIG. 4A. The immediate data is shown in Little Endian format and this data will need to be converted to the Big Endian format before addition can be performed by the adder 20. The adder 20 performs an equivalent addition, except for the noted differences in the carry enable and propagation.

Figure 5A:
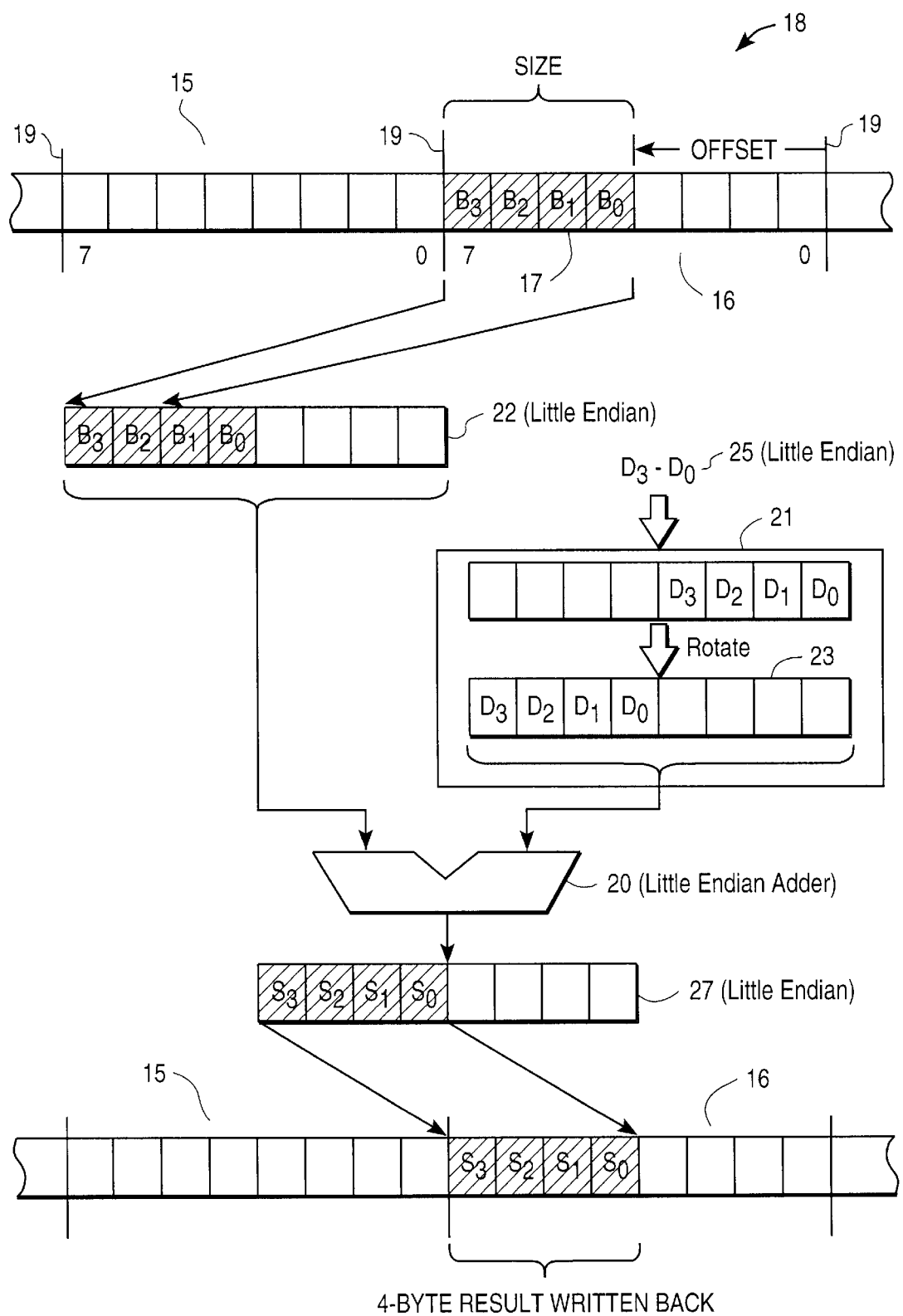
FIG. 5A illustrates another embodiment of the invention in performing unaligned addition when a stored value in memory is less than full word length and resides within a CPU word boundary in Little Endian format and the data to be added is also in Little Endian format.

FIG. 5A illustrates a situation in which less than the full eight bytes comprise the data 17, but in which a word boundary 19 is not crossed. In this instance, only one transaction is needed to read (fetch) the data 17 and one transaction to write back the data. In the example of FIG. 5A, four bytes ($B_3$–$B_0$) comprise the data 17 in Little Endian format. The four bytes are located at byte positions 7-4 of memory location 16. Thus, the size is four and the offset is four. Bytes $B_3$–$B_0$ are read into the byte locations 7-4 of the register 22 for input into the adder 20.

The data to be added is also four bytes in length in Little Endian format. The data bytes $D_3$–$D_0$ are rotated four byte positions in the rotator 21 to align with the semaphore data in register 22. The resulting sum ($S_3$–$S_0$) in register 27 is then written back to the byte positions 7-4 at memory location 16 in one transaction. As noted, the execution of the fetch-and-add and the write are much simplified when word boundaries are not crossed.

Figure 5B:
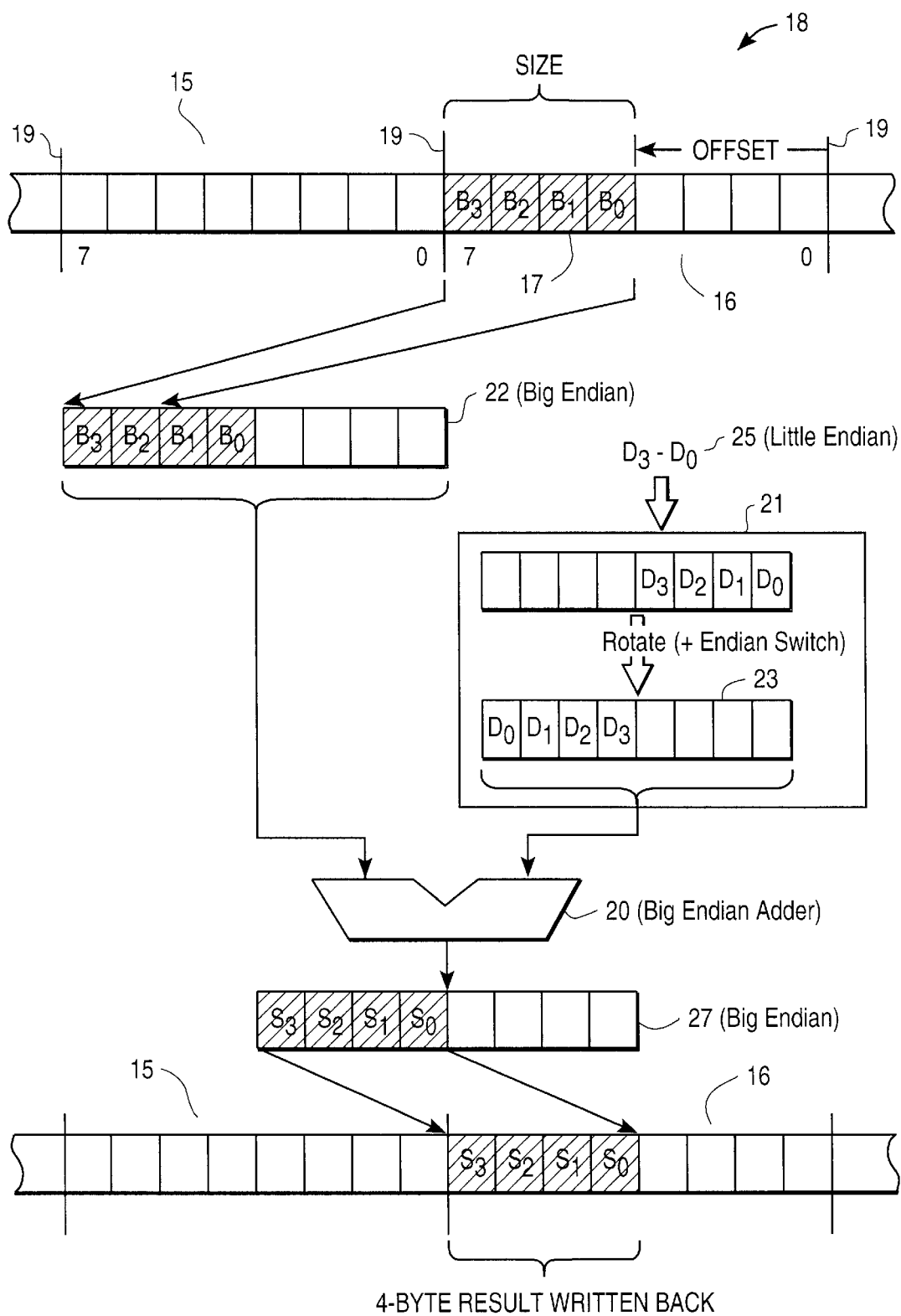
FIG. 5B illustrates another embodiment of the invention in performing unaligned addition when a stored value in memory is less than full word length and resides within a CPU word boundary in Big Endian format and the data to be added is in Little Endian format.

FIG. 5B shows the same arrangement as FIG. 5A, except that the data storage is now configured in Big Endian format. The immediate data is shown in Little Endian format and this data will need to be converted to the Big Endian format before addition can be performed by the adder 20. The adder 20 performs an equivalent addition, except for the noted differences in the carry enable and propagation.

Figure 6A:
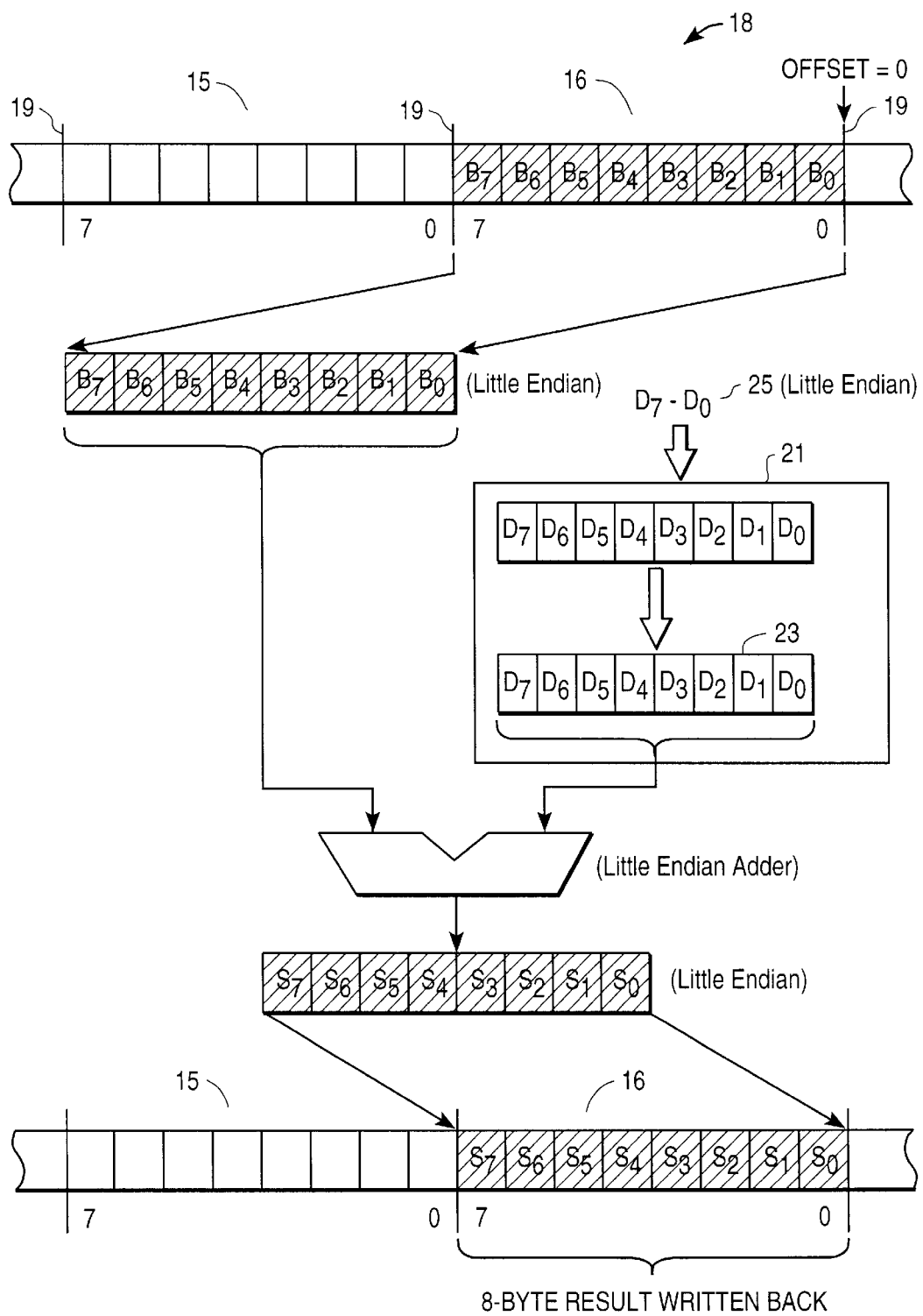
FIG. 6A illustrates another embodiment of the invention in performing unaligned addition when a stored value in memory is of full word length and resides within a CPU word boundary in Little Endian format and the data to be added is also in Little Endian format.

FIG. 6A illustrates the fourth condition when the data is fully eight bytes in length (in Little Endian format) and does not cross the word boundary. In this instance the offset is 0 and the data 15 is also aligned to the CPU, so that the data $D_7$–$D_0$ (in Little Endian format) to be added does not require rotation. The resulting sum is CPU and memory aligned and is written back to the memory location 16 without any masking in one transaction.

Figure 6B:
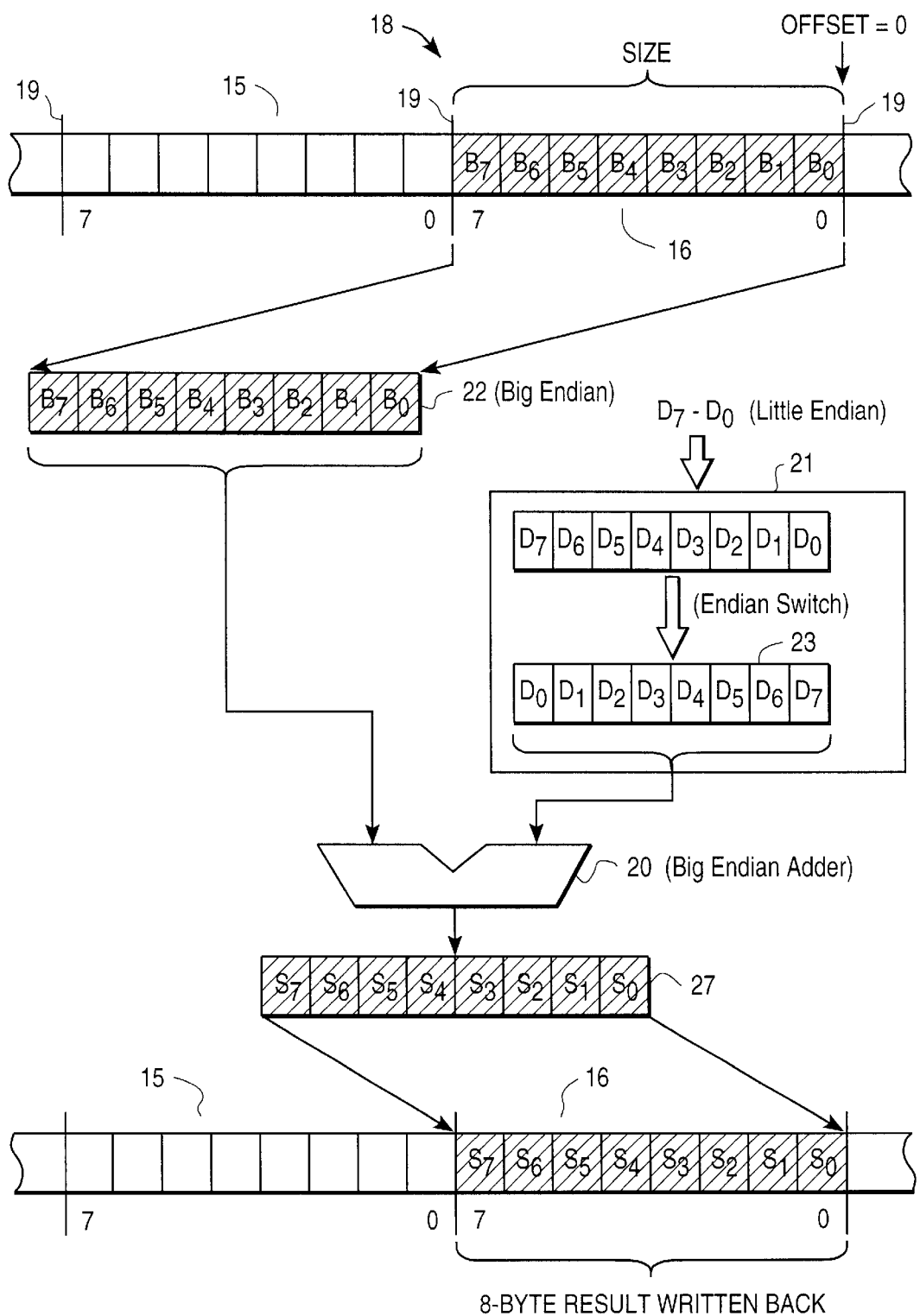
FIG. 6B illustrates another embodiment of the invention in performing unaligned addition when a stored value in memory is of full word length and resides within a CPU word boundary in Big Endian format and the data to be added is in Little Endian format.

FIG. 6B shows the same arrangement as FIG. 6A, except that the data storage is now configured in Big Endian format.

The immediate data is shown in Little Endian format and this data will need to be converted to the Big Endian format before addition can be performed by the adder 20. The adder 20 performs an equivalent addition, except for the noted differences in the carry enable and propagation.

Figure 7:
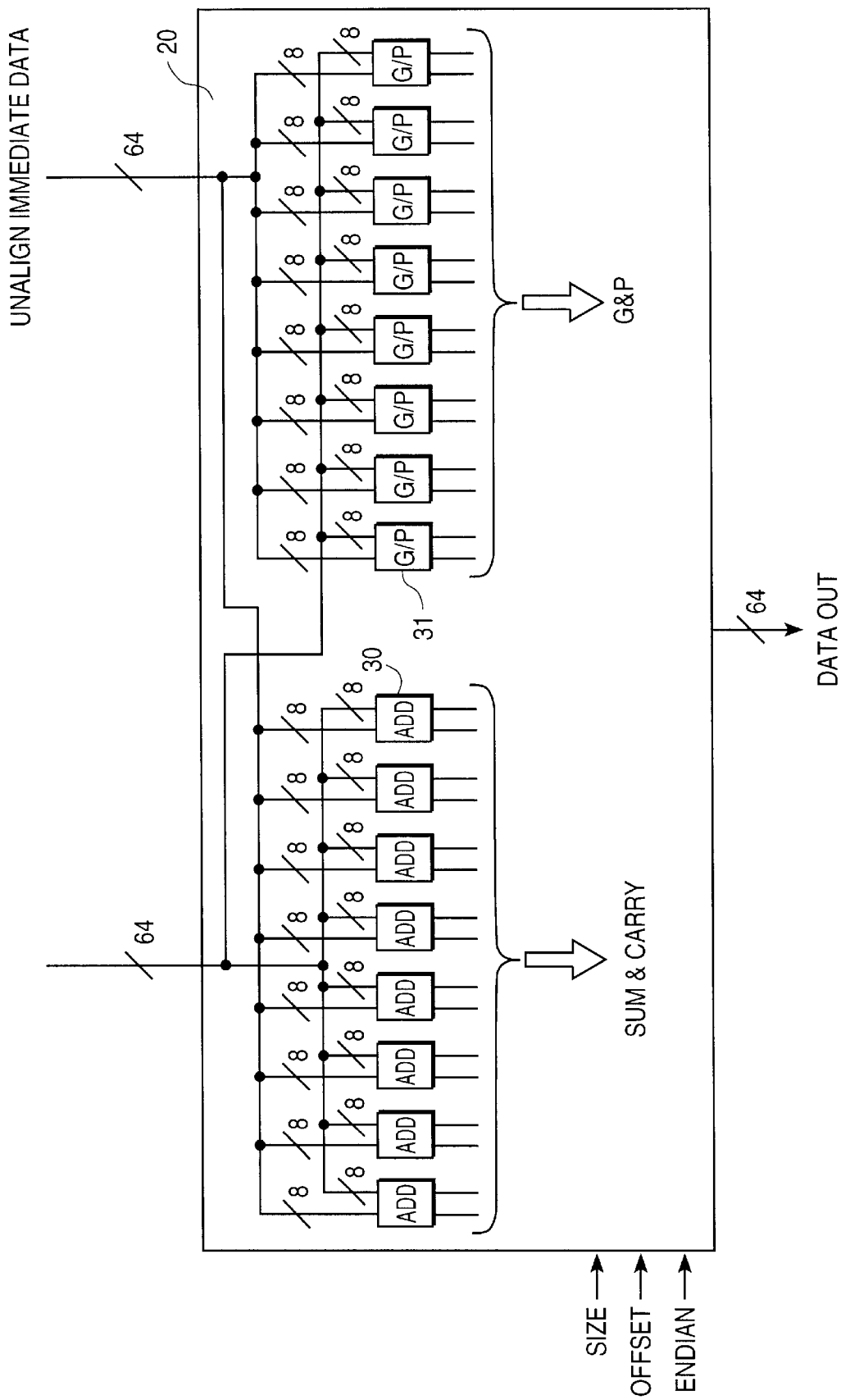
FIG. 7 is a circuit block diagram of a preferred embodiment of an adder of the present invention for performing unaligned addition.

FIG. 7 illustrates how the adder 20 operates to perform the addition. The adder 20 of the preferred embodiment is designed for operating on byte-size groupings. Accordingly, the adder 20 is comprised of eight 1-byte (each byte having 8 bits) adder units for adding corresponding bytes of the two inputs. A similar arrangement is provided with regards to the generation of Generate (G) and Propagate (P) signals for determining the carry-look-ahead for each byte. Therefore, eight G/P units 31 are provided, one each corresponding to adder units 30. A variety of known adder and G/P generation circuitry can be utilized for the units 30 and 31.

The sum and the carry signals from the adder units 30, along with the G and P signals from the G/P units 31 are utilized to generate the output from the adder 20. The necessary alignment adjustment to compensate for the unaligned data format of the two values being added, depending on the Endian format, are also discussed in reference to FIGS. 8 and 9. Since the least significant byte position ($B_0$ for Little Endian and $B_7$ for Big Endian) can be at any of the adder 30 positions, the addition operation will need to consider the location of the least significant byte. An OFFSET signal is utilized to determine the location of the least significant byte.

Likewise, the actual byte length will also determine which byte positions are to be critical for the calculation. A SIZE signal is utilized to identify the byte size of the data being added. Finally, the least significant byte position is dependent on the Endian format of the data in the memory 18 and any calculation will need to consider the location of the least significant byte if Endian format is a concern. An ENDIAN signal is used to designate the Endian format of the data stored at the location where the semaphore data is being read.

As shown in FIG. 7, the SIZE, OFFSET and ENDIAN signals are coupled to the adder 20 to control the carry from one byte to the next. The SIZE signal identifies the size, in bytes, of the semaphore being accessed in memory. When viewed in reference to FIGS. 3A–B, the SIZE indication would be 8 for the eight bytes in the data 17. The OFFSET denotes the offset of the access within the natural word size of the memory interface (in this case 0–7 bytes). In reference to FIGS. 3A–B, the OFFSET will be 6. Finally, a 1-bit ENDIAN signal identifies if the data 17 is stored in Little Endian or Big Endian format.

The adding of bits in a byte is not critical to the ordering of the bytes. What is critical is the carry flow from one byte to the next. That is, the direction of the carry flow and determining which bytes are to receive a carry in are necessary to arrive at the correct sum. Unlike aligned adders, the unaligned adder 20 does not have a dedicated alignment and a dedicated carry flow.

Figure 8:
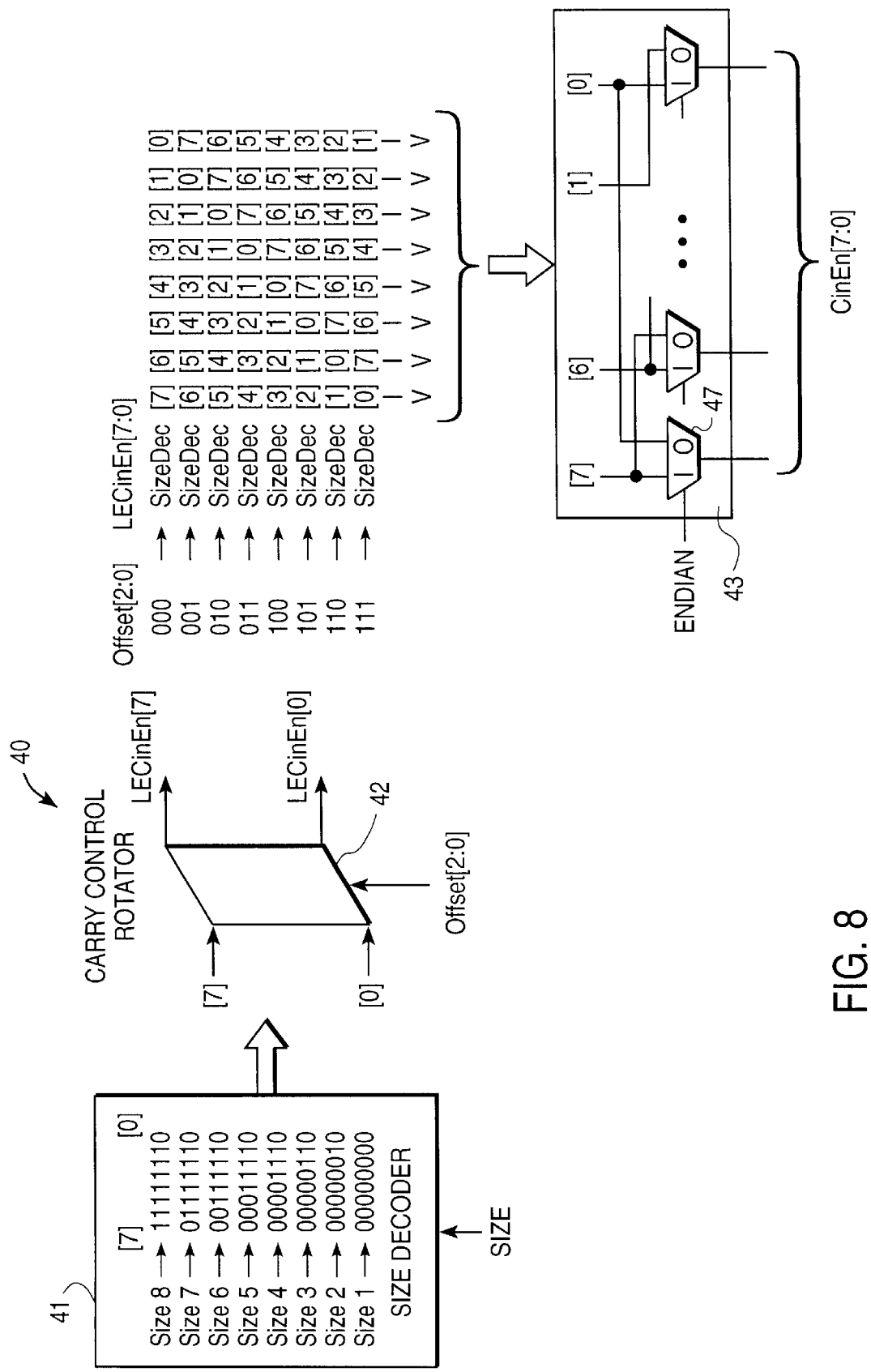
FIG. 8 is a circuit block diagram of a carry control circuitry of the preferred embodiment for enabling selected bytes which are required for calculating a sum.
Figure 9:
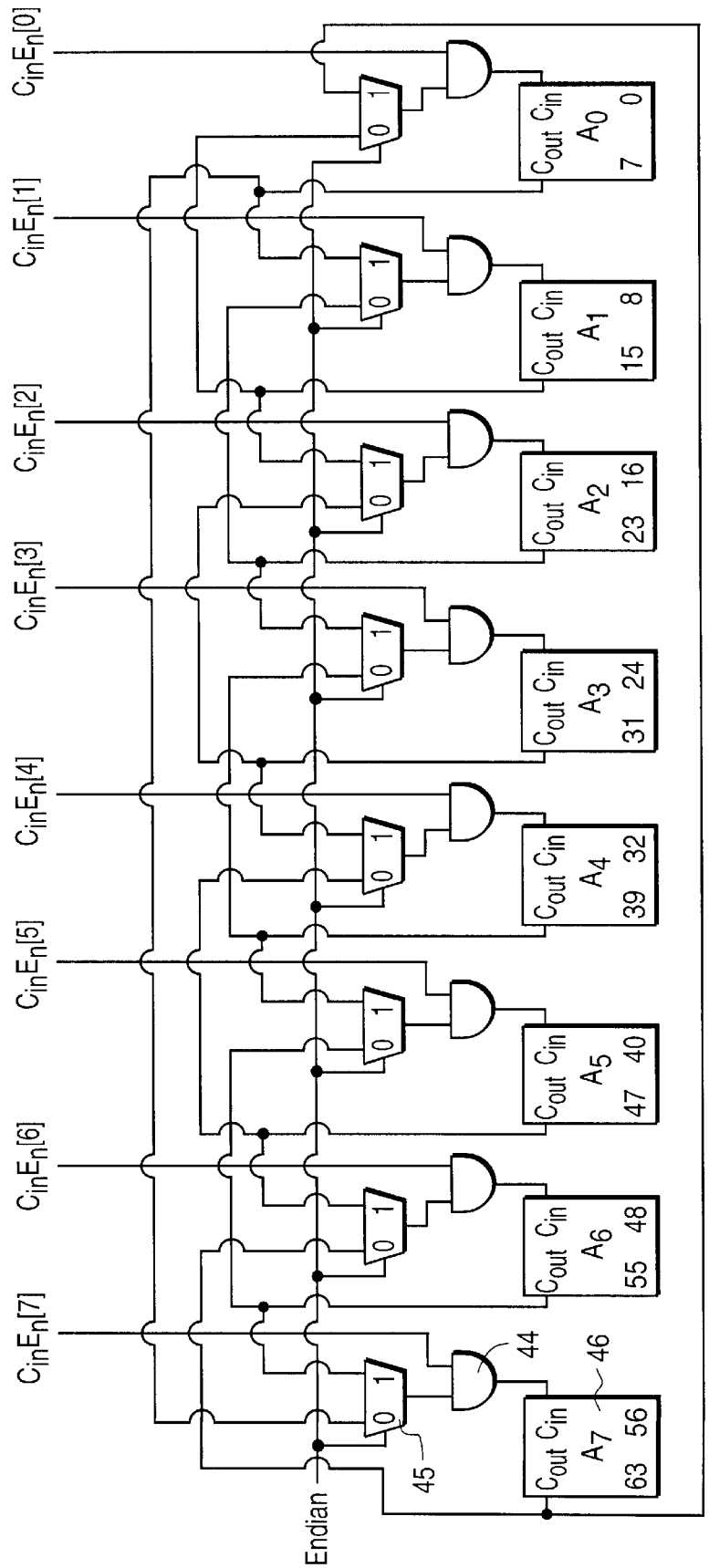
FIG. 9 is a circuit block diagram illustrating the carry flow between the byte adders for performing addition in Little Endian or Big Endian format.

As shown in FIG. 8, the adder 20 includes a carry control circuitry 40 for determining which bytes are to receive a carry input. The carry control circuitry 40 includes a size decoder 41, carry control rotator 42 and an endian transformation circuit 43. Also, the adder block 46 shown in FIG. 9, represents the combined adder and G/P units 30, 31 (which are shown separately in FIG. 7).

In the example, the SIZE signal is coupled to the size decoder 41. The size decoder 41 outputs an 8-bit decode signal (SizeDec) based on the byte size. For example, when the SIZE=8 for an 8-byte data 17, the SizeDec output has a bit pattern 11111110. The SizeDec output bits are coupled to the carry control rotator 42. The rotator 42 rotates the received bit pattern based on the OFFSET signal (OFFSET [2:0]). For example, if the OFFSET is 3 (011) for data 17, the LECinEn output from the rotator 42 is ordered as [4] [3] [2] [1] [0] [7] [6] [5]. For size 8 data with an OFFSET of 3, the LECinEn bit pattern generated is 11110111. The output of the carry control rotator 42 is referred to as Little Endian Carry In Enable (LECinEn) in the example, since this signal directly provides the Carry In Enable (CinEn) signal if in Little Endian format.

The LECinEn output from the rotator is then coupled to the endian transformation circuit 43. The transformation circuit 43 generates the CinEn [7:0] output depending on the endian format. If in Little Endian mode, the output CinEn [7:0]=LECinEn [7:0]. Hence in Little Endian mode, the LECinEn [7:0] is directly output as CinEn [7:0]. However, if in Big Endian mode, the LECinEn bits are shifted one position to the right, so that LECinEn [7] is output as CinEn [6], LECinEn [6]=CinEn [5], etc and LECinEn [0]=CinEn [7]. A variety of circuits can be utilized for providing the Endian transformation. In the preferred embodiment, the selection of the output is determined by eight multiplexers (Muxs) 47. If the data 17 is in the Little Endian format (ENDIAN=1), then the LECinEn signal is sent through as CinEn without a pattern change. However, if the data 17 is in Big Endian format (ENDIAN=0), then the muxs 47 shift the order of the bits one position to the right. For size 8 data with an offset of 3 (011) in Little Endian format, the bit pattern generated as CinEn is 11110111. For size 8 data with an offset of 3 in Big Endian format, the bit pattern is 11111011.

The CinEn bit pattern and the ENDIAN signal are then used to control which adder and G/P units 30, 31 are to receive the carry-ins and from which direction these carry-ins are to be received. Each adder byte stage 46 of 8-byte adder 20 is shown in FIG. 9 as $A_7$–$A_0$. The adder and G/P units 30 and 31 are included in the adder stage 46. The CinEn bits are shown controlling the carry-in propagation for each stage. The ENDIAN signal (ENDIAN=1 implies Little Endian, ENDIAN=0 implies Big Endian), controls the direction of carry propagation. In Little Endian mode, each byte stage 46 receives a carry in (Cin) from the next lower number stage and the carry out (Cout) of byte 7 wraps around to become the Cin of byte 0. For example, a Cout from stage $A_3$ is coupled as a Cin to $A_4$. In Big Endian mode, the carry flow is in the opposite direction. Thus, carry out from stage $A_3$ is coupled as Cin to $A_2$ and carry out from $A_0$ is sent as Cin to $A_7$. One technique to control this carry flow is by utilizing Muxs 45 coupled to each adder stage for directing the carry out to either the subsequent or previous stage's Cin input, depending on the Endian format.

As shown in FIG. 9, the CinEn bits of FIG. 8 are coupled to the byte stages $A_7$–$A_0$ to control which stages are to be enabled for receiving the Cin from another stage. In a Little Endian example of FIG. 9 where there is no offset and the SIZE=8, the CinEn pattern is 11111110. This pattern enables Cin for adders $A_7$–$A_1$. Stage $A_0$ allows no Cin from the carry out of stage $A_7$, which is as it should be since stage $A_0$ is processing the least significant byte in this instance.

As a further example, the data configuration of FIG. 3A is illustrated in reference to the adder byte stages of FIG. 9. The data in FIG. 3A is arranged as $B_1$–$B_1$–$B_7$–$B_6$–$B_5$–$B_4$–$B_3$–$B_2$. It has a size of 8 with an offset of 6 (110). The CinEn [7:0] bit pattern from FIG. 8 is [1] [0] [7] [6] [5] [4] [3] [2], so that the CinEn output pattern is 10111111. Only the stage $A_6$ of FIG. 9, corresponding to the byte $B_0$, will have its Cin disabled.

If the data had been in Big Endian format (FIG. 3B), the CinEn [7:0] bit pattern would be 11011111. Only the stage $A_5$, corresponding to byte $B_7$, would not have had its Cin enabled. As noted, the least significant byte of the data being processed in either Endian mode should always have its Cin disabled.

In reference to FIG. 4A, the byte ordering of $B_1$–$B_0$-x-x-x-x-$B_3$–$B_2$ (size=4, offset=6 for Little Endian) results in the CinEn[ 7:0] pattern of 10000011 for stages $A_7$–$A_0$. Byte $B_0$ and byte $D_0$ are added in stage $A_6$, where there is no Cin to the stage $A_6$. This is the least significant byte for the semaphore value. Bytes $B_1$ and $D_1$ are added in stage $A_7$, bytes $B_2$ and $D_2$ in stage $A_0$; and bytes $B_3$ and $D_3$ in stage $A_1$. As noted, only stages $A_7$, $A_1$ and $A_0$ have their carry in enabled. The $A_7$–$A_0$ output from the adder 20 is appropriately noted as $S_1$–$S_0$-x-x-x-x-$S_3$–$S_2$ in FIG. 4.

If the access had been in Big Endian format (FIG. 4B), the least significant byte would be $B_3$. In this instance, the CinEn [7:0] bit pattern would be 11000001. Stage $A_1$, which corresponds to the least significant byte $B_3$ in Big Endian has its Cin disabled. Only stages $A_0$, $A_7$ and $A_6$ have their Cin enabled. The $A_7$–$A_0$ output from the adder 20 is appropriately noted as $S_1$–$S_0$-x-x-x-x-$S_3$–$S_2$, with $S_3$ being the least significant byte. Similar analysis can be implemented in determining the pattern for FIGS. 5A, 5B, 6A and 6B.

Figure 10:
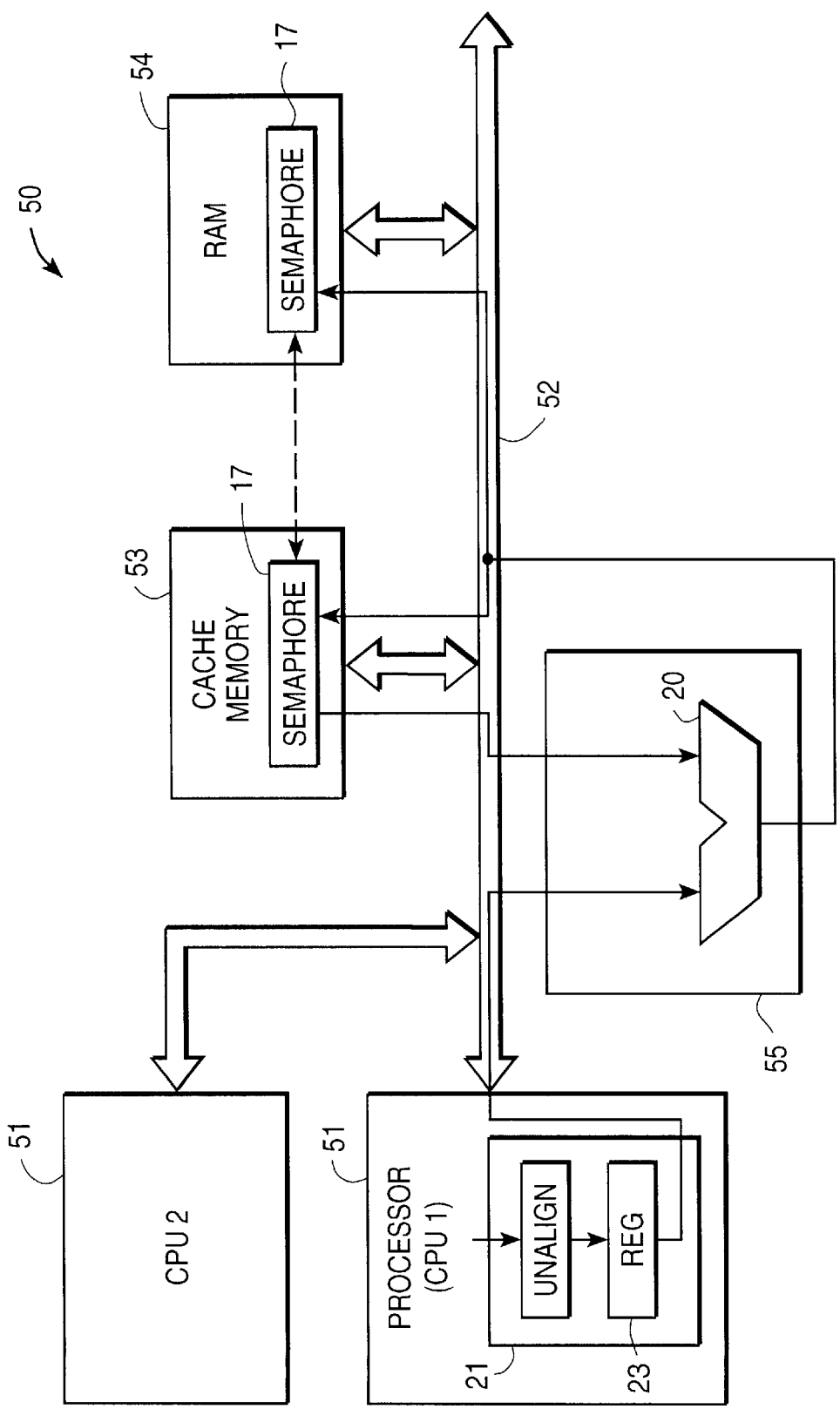
FIG. 10 is a circuit block diagram illustrating the use of a separate adder chip to provide the unaligned adder of the present invention in a multiple processor system.

Although the present invention is described in reference to providing an unaligned adder for performing semaphore operations, the present invention can be utilized in other operations not related to semaphores. Furthermore, the adder 20 can be implemented at various locations within a system. For example, a multiple processor system 50 is shown in FIG. 10, in which multiple processors (CPUs) 51 are coupled to one or more memory devices by bus 52. A cache memory 53 and main memory 54 (in form of a RAM) are shown, but other memory devices can be coupled on the bus 52, including magnetic and optical media. Also, only one bus 52 is shown, but system 50 may have multiple buses, including buses at different architecture levels.

Additionally, the semaphore can be located in any one of a variety of storage locations. In the example of FIG. 10, the main memory (RAM) 54 and the cache 53 are shared by the CPUs 51. The semaphore is shown residing in the RAM 54 and in one of the cache lines of cache 53 as cached data. The semaphore is utilized to control accesses to a shared device. In the example, RAM 54 and the cache 53 are shared by CPU 1 and CPU 2.

In the embodiment shown in FIG. 10, the unaligned adder 20 resides in a separate device 55, coupled to the bus 52. When the CPU 1 executes the fetch-and-add instruction previously described, the semaphore data is retrieved from the cache 53 (presuming that semaphore data is cached) and the value to be added retrieved from the register 23 of CPU 1 (the fetched semaphore data is also returned to the CPU). The CPU aligned value to be added is adjusted to correspond to the alignment of the semaphore value by the operation of the rotator 21. The adder 20 performs the unaligned add operation as described above and the resulting sum is returned to the semaphore location (which would be the cache 53 if caching is utilized for the semaphore data). In this configuration, one device 55 is needed no matter how many CPU's are present. When each CPU executes the fetch-and-add, the device 55 is accessed to perform the operation. The resulting sum is then written back to the semaphore location. Note, for the semaphore operation to work correctly, the read, modify, and write back operations must be performed atomically.

Figure 11:
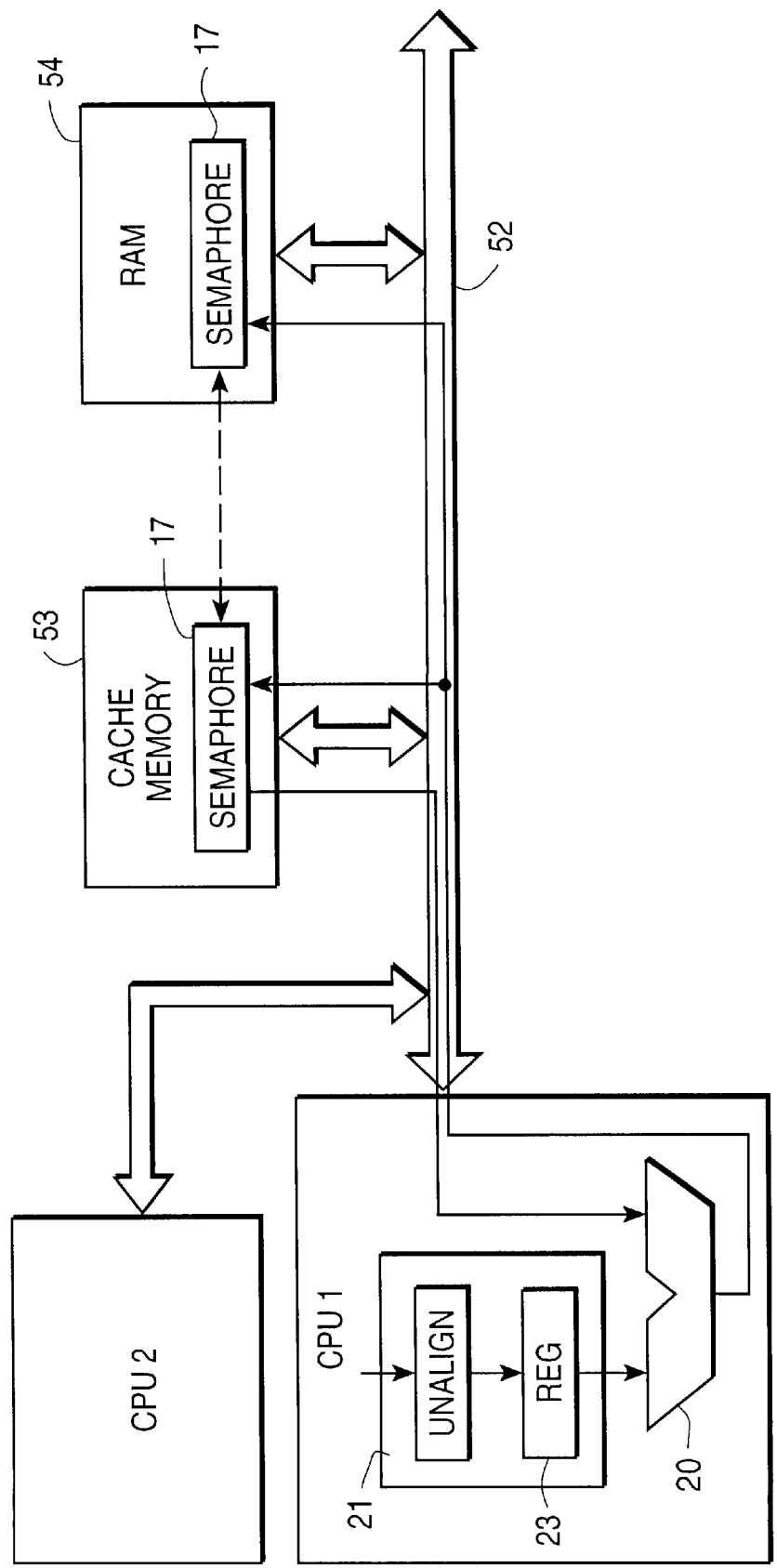
FIG. 11 is a circuit block diagram illustrating the use of the unaligned adder in one of the processor chips to provide the unaligned addition in a multiple processor system.

In another embodiment shown in FIG. 11, the adder 20 is designed as part of the processor itself. Accordingly, CPU 1 fetches the semaphore value from the cache 53 and adds the alignment adjusted value to it within CPU1. The result is then written back to the semaphore location. In this configuration, each CPU 51 requires the unaligned adder 20 to execute the fetch-and-add instruction. It is also to be noted that the adder 20 can be included as part of an internal cache memory of CPU 1. Again, for the semaphore operation to work correctly, the read, modify, and write back operations must be performed atomically.

Figure 12:
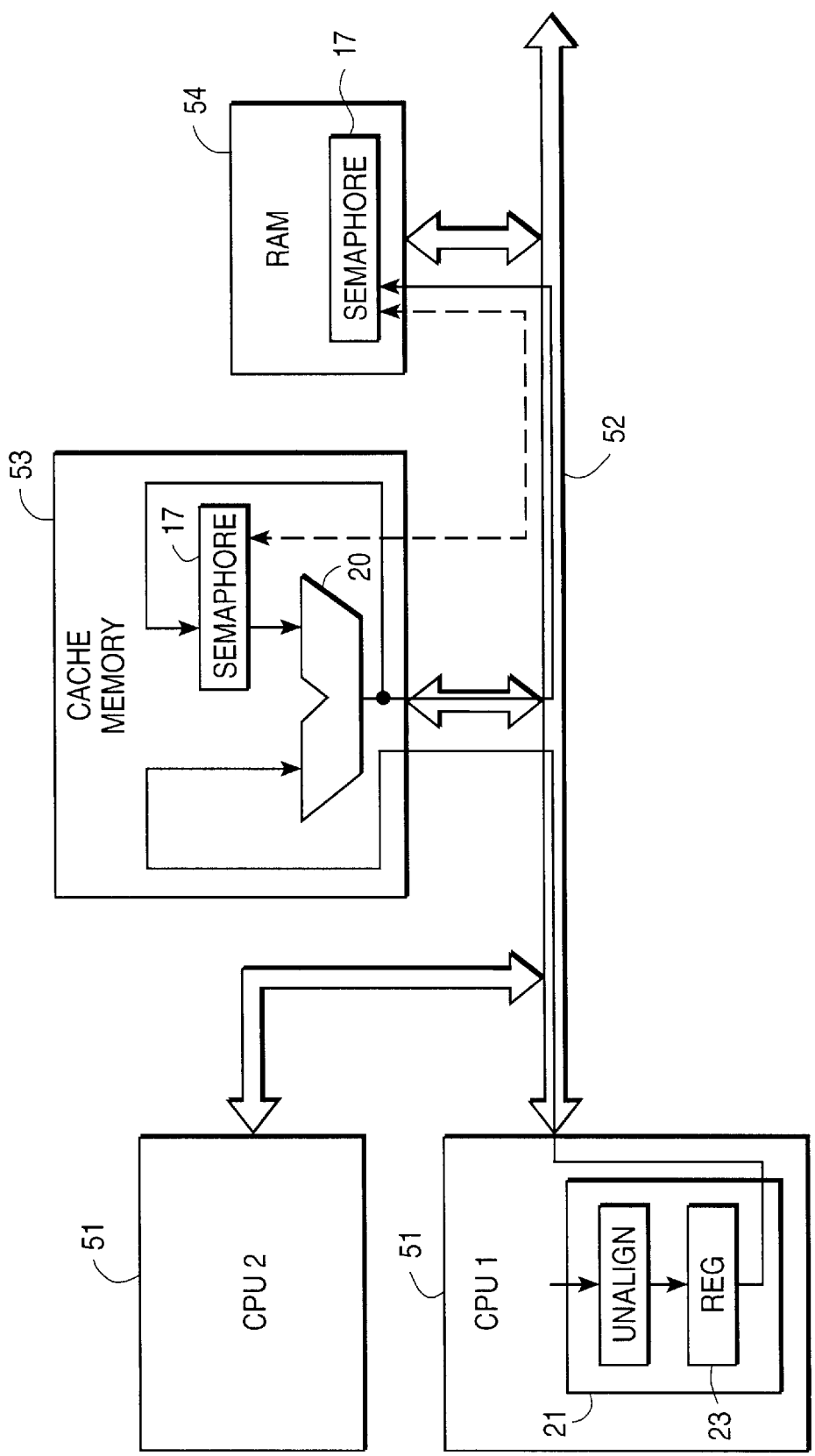
FIG. 12 is a circuit block diagram illustrating the use of the unaligned adder in a cache memory to provide the unaligned addition in a multiple processor system.

Still another embodiment is shown in FIG. 12. In this configuration, the unaligned adder 20 is designed into the shared cache 57. When CPU 1 executes the fetch-and-add instruction, the value to be added is sent to the cache 57. This value is added to the semaphore value (the semaphore value is returned to the CPU before modification takes place) and the resulting sum is written back to the memory. This configuration is similar to that shown in FIG. 10, except that instead of utilizing a separate device or chip, the adder is made part of the shared cache 57. As previously noted, for the semaphore operation to work correctly, the read, modify, and write back operations must be performed atomically.

Figure 13:
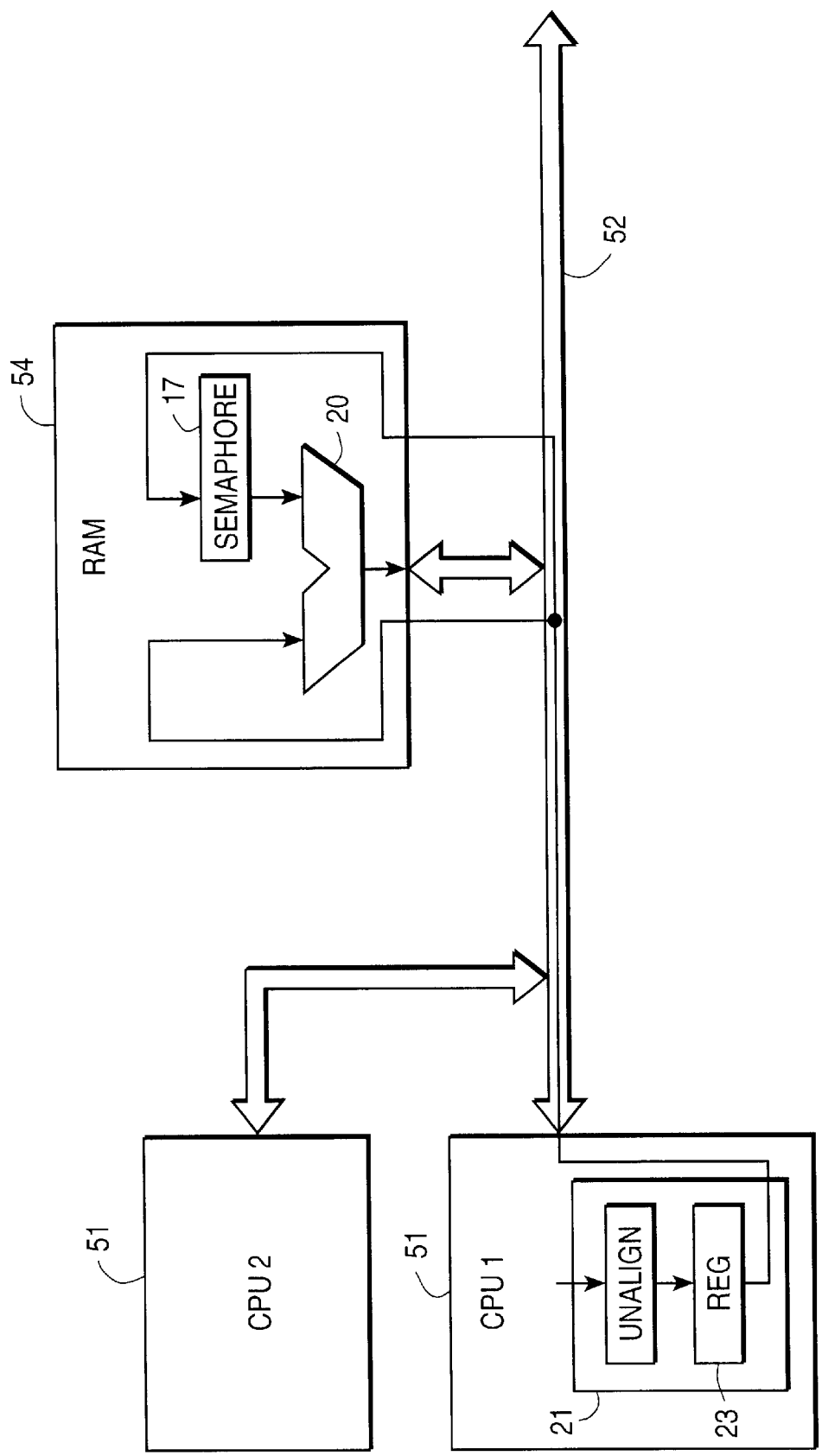
FIG. 13 is a circuit block diagram illustrating the use of the unaligned adder in a RAM memory to provide the unaligned addition in a multiple processor system.

In the embodiment shown in FIG. 13, the adder 20 is designed as a part of the memory array, and the semaphore memory is treated as uncachable. The semaphore data is retrieved from the memory and sent to the CPU1 and the adder 20, the CPU1 supplies the value to be added to adder 20 in an unaligned format, and the adder result is written back to memory. The entire read-modify-write sequence must be atomic for the semaphore to work properly.

As noted, there are a variety of locations where the adder of the present invention can be made to reside to perform the unaligned addition. The unaligned adder of the present invention can be made to perform the unaligned addition for a variety of reasons and is not limited to supporting semaphore instructions. The fetch-and-add instruction is presented as one example of a semaphore operation. Other instructions can readily utilize the unaligned adder. Furthermore, the use of semaphore operations makes sense when multiple processing devices are present, but it is understood that single processor systems could utilize the unaligned adder as well. Thus, a technique for providing an unaligned adder is described.

We claim:

1. An apparatus comprising:
   an adder for receiving a first data from a storage location in which the first data is stored in byte format, but in which the first data is not stored fully aligned within processor data boundaries for data retrieval;
   said adder also for receiving a second data having its byte alignment adjusted to correspond to a byte alignment of the first data as received by said adder and adding corresponding bytes of the first data and the second data;
   a carry control circuit coupled to said adder for determining which bytes are selected for transfer of a carry from one byte to the next for calculating a sum of the two data.

2. The apparatus of claim 1 wherein said carry control circuit includes a decoder for generating an enabling signal based on a number of bytes present in the first data, the enabling signal for selecting which of the carries are to be enabled.

3. The apparatus of claim 2 wherein said carry control circuit includes a rotator coupled to said decoder for rotating bits of the enabling signal to align a least significant byte of the enabling signal to a least significant byte of the data to be added.

4. The apparatus of claim 3 wherein the storage location of the first data crosses a processor data boundary, in which byte ordering of the first data is not maintained when fetching the first data from the storage location.

5. The apparatus of claim 3 wherein said carry control circuit includes a circuit to change an order of the generated enabling signal for reversing a direction of the carry transfer for data stored in an Endian format having reverse ordering of the bytes.

6. The apparatus of claim 3 further including a second rotator coupled to said adder for receiving the second data as processor aligned data and rotating bytes of the processor aligned data to adjust for the second data to be aligned to the first data.

7. An apparatus for performing unaligned addition comprising:
   a first register for receiving a first data from a storage location in which the first data is stored in byte format, but in which the first data may not be stored fully aligned within processor data boundaries for data retrieval;
   a second register for receiving a second data which is to be added to the first data, the second data having its byte alignment adjusted to correspond to a byte alignment of the first data;
   an adder configured to add the two data in byte groupings, each byte grouping having a carry in from a lower order byte grouping, said adder coupled to said first and second registers;
   a carry control circuit coupled to said adder for determining which bytes are enabled for receiving a carry in to calculate a sum of the two data, the sum having the same byte alignment as said first data.

8. The apparatus of claim 7 wherein said carry control circuit includes a decoder for generating an enabling signal based on a number of bytes present in the first data, the enabling signal for selecting which of the carries are to be enabled when calculating the sum.

9. The apparatus of claim 8 wherein said carry control circuit includes a rotator coupled to said decoder for rotating bits of the enabling signal to align a least significant byte of the enabling signal to a least significant byte of the data to be added.

10. The apparatus of claim 9 wherein the storage location of the first data crosses a processor data boundary, in which byte ordering of the first data is not maintained when reading the first data from the storage location.

11. The apparatus of claim 10 wherein bytes to one side of the processor data boundary are fetched to align to the lesser significant byte positions within the first register and the bytes to the other side of the processor data boundary are fetched to align to the more significant byte positions within the first register.

12. The apparatus of claim 11 wherein said second register receives the second data as processor aligned data and rotates bytes of the processor aligned data to adjust the second data to be aligned to the first data.

13. The apparatus of claim 11 wherein said carry control circuit includes a circuit to change an order of the generated enabling signal for reversing a direction of the carry transfer for data stored in an Endian format having reverse ordering of the bytes.

14. A computer system in which unaligned addition is performed on data comprising:

a processor for processing data;

a memory for having a first data stored in a storage location in byte format, but in which the first data may not be stored fully aligned within processor data boundaries for data retrieval from said memory;

an adder coupled to said processor and said memory for receiving the first data from the storage location;

said adder also for receiving a second data having its byte alignment adjusted to correspond to a byte alignment of the first data as received by said adder and adding corresponding bytes of the first data and the second data;

a carry control circuit coupled to said adder for determining which bytes are selected for transfer of a carry from one byte to the next for calculating a sum of the two data.

15. The computer system of claim 14 wherein the first data is used as a semaphore, wherein the sum is written back to the storage location as modified data to change a value of the semaphore.

16. The computer system of claim 15 wherein said processor executes a semaphore instruction, in which an immediate operand of the instruction specifies the second data that is added to the first data and in which the sum is written back to the storage location.

17. The computer system of claim 16 wherein the semaphore instruction is a fetch-and-add instruction.

18. The computer system of claim 16 wherein said processor, adder and carry control circuit are all on a same chip, when multiple processors are present in the computer system.

19. The computer system of claim 16 wherein said adder and carry control circuit are on a cache memory chip, when multiple processors are present in the computer system.

20. A method of performing unaligned addition comprising:

fetching a first data from a storage location in which the first data is not stored fully aligned within processor data boundaries for data retrieval;

receiving a second data having its alignment adjusted to correspond to the alignment of the first data;

adding the first data and the second data;

generating a sum which has its alignment corresponding to the alignment of the first data.

21. The method of claim 20 further comprises writing the sum back to the storage location to modify the first data with the sum.

22. The method of claim 21 further comprises executing a semaphore instruction to perform the fetching, receiving and adding the two data as a semaphore operation to generate the sum.

23. A method of performing unaligned addition comprising:

fetching a first data from a storage location in which the first data is stored in byte format, but in which the first data is not stored fully aligned within processor data boundaries for data retrieval;

receiving a second data having its byte alignment adjusted to correspond to a byte alignment of the first data;

adding corresponding bytes of the first data and the second data;

utilizing a carry enabler to determine which bytes are selected for transfer of a carry from one byte to the next;

generating a sum which has its alignment corresponding to the alignment of the first data.

24. The method of claim 23 further comprises writing the sum back to the storage location to modify the first data with the sum.

25. The method of claim 24 further comprises executing a semaphore instruction to perform the fetching, receiving and adding the two data as a semaphore operation to generate the sum.

* * * * *